May 28, 1935.  M. FRÄNKL  2,002,941

METHOD AND MEANS OF SEPARATING GAS MIXTURES

Filed Oct. 21, 1931  3 Sheets-Sheet 1

INVENTOR
MATHIAS FRÄNKL
BY
Watson, Bristol, Johnson & Leavenworth
ATTORNEYS

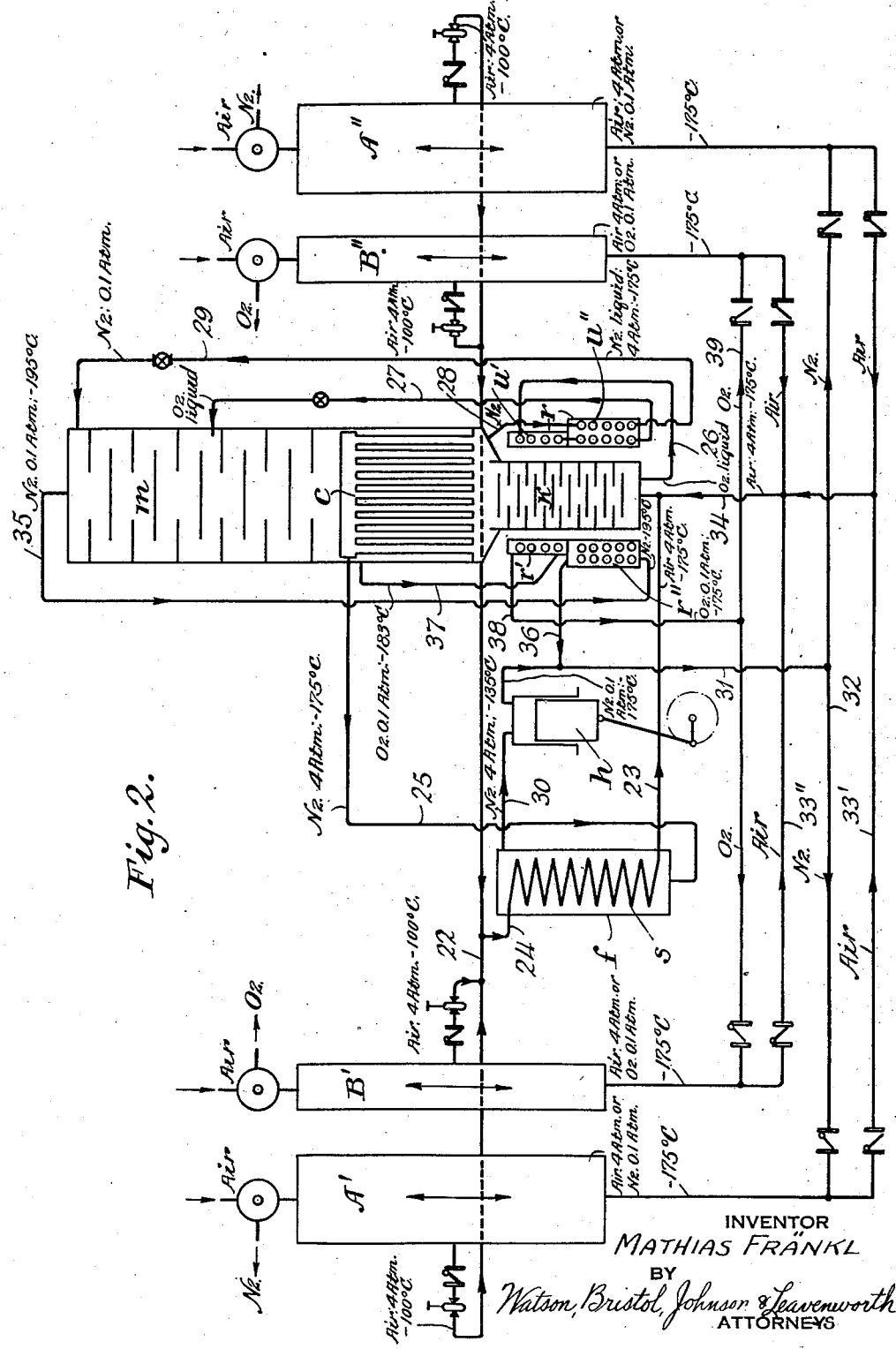

May 28, 1935. M. FRÄNKL 2,002,941
METHOD AND MEANS OF SEPARATING GAS MIXTURES
Filed Oct. 21, 1931 3 Sheets-Sheet 3
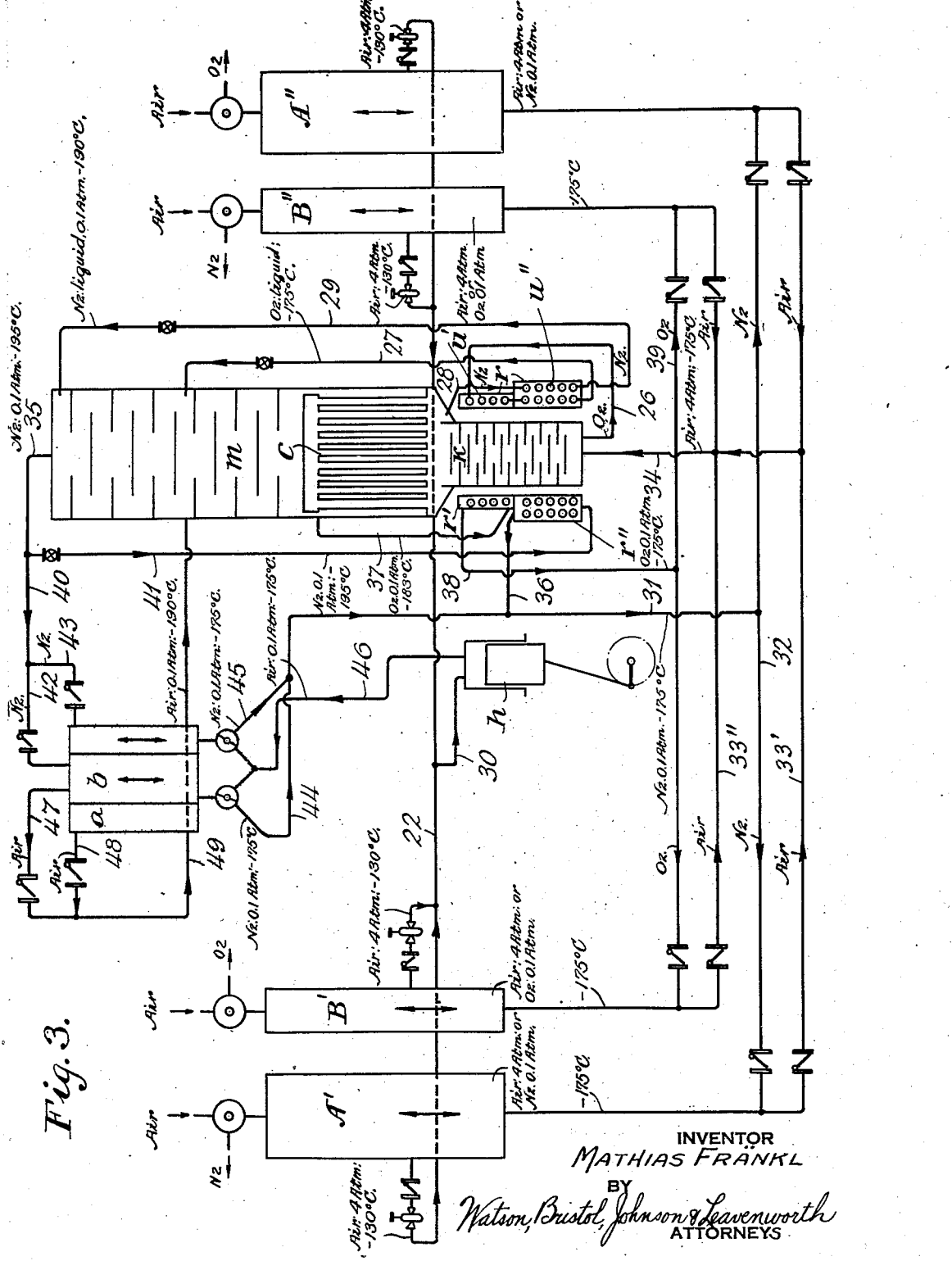

Patented May 28, 1935

2,002,941

UNITED STATES PATENT OFFICE 2,002,941

METHOD AND MEANS OF SEPARATING GAS MIXTURES

Mathias Fränkl, Augsburg, Germany, assignor to American Oxythermic Corporation, New York, N. Y., a corporation of Delaware Application October 21, 1931, Serial No. 570,119 In Germany November 12, 1930

11 Claims. (Cl. 62—175.5)

This invention relates to improvements in a method and an apparatus for separating gaseous mixtures. The invention refers more particularly to gas mixtures, such as air, containing components having different boiling points, and is a continuation in part of my application, Serial No. 437,204, filed March 19, 1930, which has now matured into Patent No. 1,970,299, granted August 14, 1934, for Low pressure process for separating low boiling gas mixtures.

The term "atmospheres" employed throughout this specification as a unit of pressure indicates atmospheres above atmospheric pressure. The term "primary separation" describes the first separation step by means of which liquid oxygen of 40–45% purity is produced, whereas the term "secondary separation" refers to the final separation step resulting in an oxygen having 90–98% $O_2$.

According to the process described in the above-identified application, gaseous nitrogen produced during the primary separation is led to an expansion engine. If oxygen having 45% $O_2$ is to be produced by this process, the nitrogen has at this stage a temperature of $-188°$ C. and a pressure of 2 atmospheres, whereas in processes for the production of oxygen having 90 to 99% $O_2$ the nitrogen has a temperature of $-175°$ C. and a pressure of 4 atmospheres. This nitrogen expands in the expansion-engine, acquires a pressure which is only 0.1 atm. and is cooled to $-195°$ C. Then the nitrogen enters into a cold-exchange relation with the wash liquid and further cools this liquid, which was previously cooled to $-175°$ C., to $-190°$ C., thus recovering the cold losses of the device. Therefore, according to this process of my co-pending application, the cold production of the expansion engine is utilized at a later stage of the process, due to the fact that the cooled nitrogen after having left the engine transfers its cold contents created by the engine to the wash liquid.

I have found that, if a gas having a temperature of $-175°$ C., or a still lower temperature, enters into the expansion engine, liquid will be formed in this engine during the subsequent expansion process, as the whole process occurring therein takes places within the range of saturation of the gas. The formation of liquid, however, considerably diminishes the cold production of the engine.

An object of this invention is to eliminate the above-mentioned drawback by providing a process for separating gaseous mixtures wherein a gas is brought into a cold-exchange relation with a warmer gas having an equal or higher pressure before the first-mentioned gas enters an expansion engine, the first-mentioned gas losing, during this exchange, as much cold as can be added thereto during its subsequent expansion in the expansion engine. Either nitrogen having a comparatively high pressure, or low pressure air, may be used.

Another object of the invention is to provide a process in which air or nitrogen having a pressure equal to that prevailing during the primary separation and in an amount sufficient for the primary cooling of the operating gas mixture of a higher pressure, is led through a counter-current heat exchanger.

A further object provides a process wherein air or nitrogen is led through a liquefier either together with the nitrogen passing into the expansion engine, or separately therefrom, before arriving at the primary cooler.

Still another object, relates to the production of a 45% $O_2$ oxygen, wherein the air or nitrogen leaving a primary cooler is introduced into a middle-pressure compressor, compressed therein to 15–25 atm., or even higher, is cooled by the primary cooler, and liquefied in a liquefier. The liquid is then led into a primary separating device, or a secondary separating device. If oxygen having 90–99% $O_2$ is to be produced, a part of the air having a temperature of about $-100°$ C. is withdrawn from regenerators and cooled to a temperature of about $-175°$ C. in a tubular counter-current cold exchanger by the nitrogen which later operates in an expansion engine.

This invention may be practiced by providing a device in the path of the gas passing into an expansion engine, by means of which said gas loses as much cold as it gains subsequently in the expansion engine.

When a gas having 90% or more oxygen is to be produced, the nitrogen has a condensation pressure of 4 atm. during a primary separation step and emerges, after said separation, in a gaseous state having the same pressure and a temperature of $-175°$ C. The difference in temperature which can be obtained in practice in an expansion engine is about 40° C., so that the nitrogen can be heated before entering said engine to $(-175° + 40° =) -135°$ C. I prefer to heat said nitrogen by bringing it into a continuous cold-exchange relation with a corresponding amount of air or nitrogen having a pressure of at least 25 atm. in a tubular cold exchanger. The gas used as a cold absorber which has been previously cooled to —135° C. and compressed to 25 atm. is liquefied.

When oxygen having 45% O₂ is to be produced, the separated nitrogen has a temperature of —187° C. and a pressure of 2 atm. The difference in temperature obtained in an expansion engine is about 20° C. The nitrogen, before it enters this engine, is passed in a cold-exchange relation with a gas (which may be air or nitrogen) cooled to —165° C. and compressed to 15 atm. The gas is then liquefied and its cold is used to cover cold losses of the apparatus.

If oxygen having up to 45% O₂ is to be produced, the whole process may be carried out in a so-called lower column for the primary separation, whereas for methods having for their object the production of oxygen of a higher O₂ content a subsequent rectification in an upper column must take place until the gas has reached the desired purity. In the first instance, therefore, the separated nitrogen is used only as a gas under pressure which loses said pressure in the expansion engine. In the second instance, a part of the separated nitrogen must be liquefied and introduced into the upper column at its top to be used as the washing substance for the secondary rectification.

About 2.5 cubic meters of nitrogen having a pressure of 2 atm. may be utilized for the operation of the expansion engine for each 5 cubic meters of air when oxygen having 45% O₂ is to be produced. For an oxygen having 95% O₂ only 1.5 cubic meters of nitrogen is available, said nitrogen having, however, a pressure of 4 atm. An equal cold production is obtained in both cases.

After the nitrogen has liquefied a corresponding amount of gas having a pressure of 15 atm. and has been warmed to —165° C., it is caused to lose its pressure in an expansion engine when oxygen having 45% O₂ is to be produced. Thereafter, the nitrogen cannot be used for cooling wash liquid because this liquid has approximately the same temperature as the nitrogen leaving the expansion engine.

During the process having for its object the production of a 90–98% O₂ oxygen, the nitrogen is separated during the secondary separation step at practically no pressure. This nitrogen has a temperature of —195° C. so that it is cooler by about 20° C. than the wash liquid. Therefore, this nitrogen can be used for a subsequent cooling of said liquid to prevent a partial evaporation during the drop in pressure from 4 to 0.1 atmospheres.

The produced oxygen is colder by 8° C. than the air entering the primary separating device in both cases, i. e., irrespective of whether an oxygen having 45% O₂ or 95% O₂ is to be produced.

In processes using cold accumulators and a periodical reversal of the gas flow, the cold supplied to the accumulators, which exceeds the cold capable of being taken in by the air up to its liquefaction, is lost practically to its full amount. A liquefaction of air in the cold accumulators should be avoided because the liquid remaining as moisture on the surfaces of the regenerative bodies, or packing material, would evaporate as soon as the flow would be reversed and nitrogen or oxygen passed through the accumulator, due to the fact that the liquid cannot remain there in this form without pressure. Care must therefore be taken that neither the nitrogen nor the oxygen should enter the regenerators at a temperature lower than the temperature of liquefaction of the air to be separated.

If the temperature of liquefaction of air is, for instance, —175° C., the separated components must be warmed up to at least —180° C. before they are led through the regenerators. This heating step is accomplished by bringing them in a cold-exchange relation with wash liquid. The separated nitrogen may be brought in contact first with the liquid nitrogen used as wash liquid and then with a wash liquid containing a large amount of oxygen, whereas the oxygen may be brought in cold-exchange relation only with the latter wash liquid.

In processes having for their object the production of a 45% O₂ oxygen, only the cold content of oxygen is diminished in the secondary cooler, the temperature rising from —188° C. to —180° C.

As has already been mentioned, a certain amount of gas (air or nitrogen) must be compressed to 25 atm. or 15 atm. in order to be liquefied by the cold content of the nitrogen before it flows into an expansion engine, the temperature of nitrogen rising to —135° C. (for 95% O₂ oxygen) or —165° C. (for 45% O₂ oxygen). Without this prior compression no liquefaction could take place at temperatures amounting to —135° C. or —165° C.

It will be noted from the above that a preliminary cooling step is necessary to cool this gas to —135° C. or —165° C. prior to liquefaction. A corresponding amount of nitrogen leaving the primary separation device is led for that purpose through a counter-current heat exchanger, transmitting therein its cold to nitrogen compressed to 25 atm. or 15 atm. and cooling it thereby prior to its liquefaction to —135° C. or —165° C.

Six cubic meters of nitrogen must give up a part of their cold contents corresponding to a rise in temperature from —175° C. to —135° C. to liquefy 1 cubic meter of nitrogen at 25 atm. pressure. Five cubic meters are then led into an expansion engine with a temperature of —135° C., while 1 cubic meter is led through a counter-current cold exchanger to cool the above-mentioned 1 cubic meter of nitrogen at 25 atm. pressure and is heated to +20° C. Then the heated cubic meter of nitrogen is sucked into the compressor, compressed from 4 atm. to 25 atm., led again through the counter-current cold exchanger, cooled to —135° C., and then liquefied.

When a 45% O₂ containing oxygen is to be produced, the nitrogen is led through the primary cooler at a pressure of 2 atm., is compressed to 15 atm., cooled to —165° C., and then liquefied. In this case it is necessary to pass 10 cubic meters of nitrogen through the liquefier to liquefy 1 cubic meter of nitrogen, 9 cubic meters flowing into an expansion engine while 1 cubic meter flows through the primary cooler.

The invention will appear more clearly from the following detailed description, when taken in connection with the accompanying drawings, which illustrate preferred embodiments of a manner and of an apparatus in which the process may be practiced.

In the drawings—

Figure 2 shows diagrammatically an apparatus for producing oxygen having more than 90% O₂; and Figure 3 shows another modification of the invention.

Figure 1:
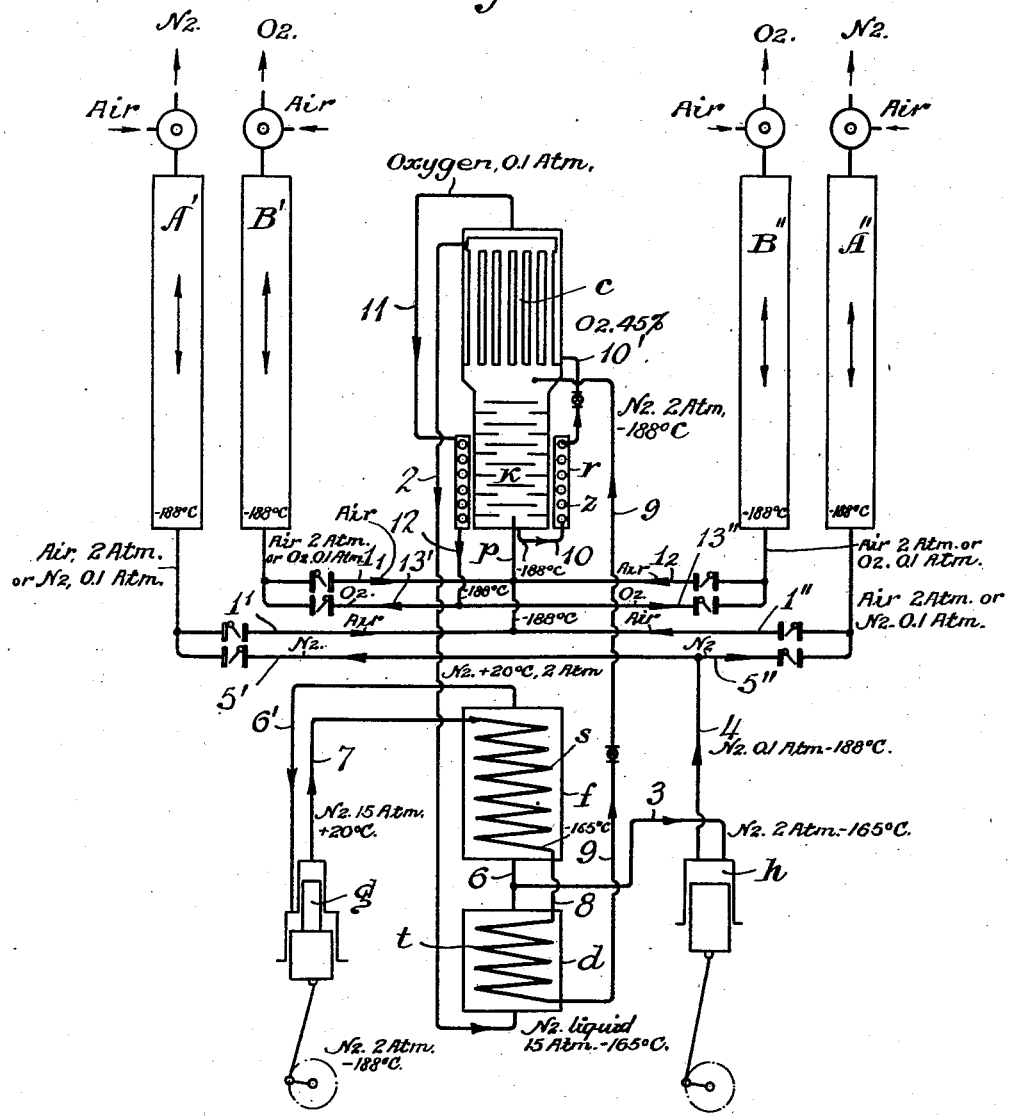
Figure 1 depicts an apparatus for producing oxygen having 45% O₂.

In the apparatus shown in Figures 1 and 2, an expansion engine is operated by nitrogen after it has left the pressure column.

The apparatus shown in Figure 1 comprises a pair of regenerators A', A" for air and nitrogen, another pair of regenerators B', B" for air and oxygen, and a liquefier $d$. A condenser $c$ acts also as an evaporator for the liquid oxygen. The apparatus further comprises a counter-current cold exchanger $f$, a compressor $g$, an expansion engine $h$, and a pressure column $k$ for primary separation. A secondary cooler $r$ for the liquid is used to transmit cold contained in gaseous oxygen to liquid containing oxygen.

The operation is as follows:

The air which is to be separated into components is led alternately through a pair of the regenerators in a compressed state and passes through the conduits 1' and 1₁, or 1" and 1₂, into a conduit $p$ leading to the pressure column $k$ for primary separation and is introduced at the bottom of said column at a pressure of 2 atmospheres. The air is separated in the column $k$ into oxygen having 40–45% $O_2$ and a practically pure nitrogen, the components retaining the pressure of the gas mixture. Separated nitrogen having a temperature of —188° C. passes from the condenser $c$ through a conduit 2 into the liquefier $d$ and is warmed therein to —165° C. The cold lost by this gas is transmitted to nitrogen compressed to 15 atm. and contained within a tubular spiral $t$ of the liquefier $d$, the last-mentioned compressed nitrogen being thereby liquefied.

The gaseous nitrogen warmed to —165° C. within the liquefier $d$ is separated into two parts as soon as it leaves this liquefier. One part comprising nine-tenths of the total amount of the warmed nitrogen is led through a conduit 3 into the expansion engine $h$. The gas expands therein and cools off again to —188° C., its pressure being diminished to 0.1 atm. Then the nitrogen leaves the engine $h$ through a conduit 4, and passes through the conduit 5" or 5' into regenerator A" or A', leaving the apparatus at the upper end of the regenerator.

The remainder of the warmed nitrogen leaving the liquefier $d$, which comprises one-tenth of the total amount of warmed nitrogen, passes through a conduit 6, the counter-current cold exchanger $f$, and a conduit 6' into a compressor $g$ wherein it is compressed to 15 atm. The compressed nitrogen leaves the compressor $g$ through the conduit 7 and passes through a tubular spiral $s$ situated within the counter-current cold exchanger $f$. The nitrogen is cooled in the spiral $s$ to —165° C. and it then passes through the conduit 8 into the tubular spiral $t$ situated within the liquefier $d$. This nitrogen is liquefied in the spiral $t$ due to cold-exchange relation with the nitrogen surrounding the spiral $t$, the liquid nitrogen flowing through a tube 9 into the pressure column $k$ where it serves to cover the cold losses.

The liquid oxygen containing 40–45% $O_2$ leaves the column $k$ through the conduit 10 and passes through the tubular helical spiral $z$ situated within the secondary cooler $r$. The liquid oxygen leaves the spiral $z$ through the conduit 10', passes to the condenser evaporator $c$, and is introduced on the evaporator side thereof. The liquid oxygen is evaporated in the condenser $c$ and passes, in the form of a gas, through a conduit 11 into the secondary cooler $r$. The gaseous oxygen comes into a cold-exchange relation with the liquid oxygen flowing through the spiral $z$ within the cooler $r$ and is heated somewhat therein. Then the gaseous oxygen passes through the conduit 12 and the conduit 13' or 13" into regenerator B' or B" and leaves the apparatus at the upper ends of said regenerators.

In the modification shown in Figure 2, the apparatus comprises regenerators A', A", B' and B", a condenser evaporator $c$, a counter-current cold exchanger $f$, an expansion engine $h$, a pressure column $k$ for primary separation, a column $m$ for secondary separation, and a secondary cooler $r$ for wash liquid containing tubular spirals $u'$ and $u"$.

This modification refers to a process and an apparatus for producing oxygen having 90–95% $O_2$ and comprises an important improvement over the apparatus shown in Figure 1, consisting in utilizing the cold production of the expansion engine $h$ without having to compress a certain amount of air or nitrogen to 15–25 atm. to liquefy the same. The improvement is based on the fact that the cold losses of the apparatus may be compensated by cooling a certain amount of air or nitrogen from about —100° C. to about —175° C. by the cold production of the expansion engine.

The apparatus operates as follows:

The compressed air which is to be separated into components is introduced alternately into a pair of regenerators and is cooled therein. About one-tenth of the total amount of air flowing through a regenerator is withdrawn at a point intermediate the ends, e. g., about the middle of the regenerators and is led through a conduit 22, this taking-out step occurring alternately at one or the other pair of regenerators. The air flowing through the conduit 22 has a temperature of about —100° C. and is led through a conduit 24 into the tubular spiral $s$ of the counter-current cold exchanger $f$. It is cooled in the spiral $s$ to about —175° C. by gaseous nitrogen passing out of the condenser $c$ through a conduit 25 into the exchanger $f$.

The air cooled to —175° C. leaves the spiral $s$ through the conduit 23 and enters the pressure column $k$ where it is liquefied and separated into components; this primary separation, however, is only a preliminary one as the separated oxygen contains only about 40–45% $O_2$. A liquid containing this percentage of $O_2$ is led from the column $k$ through a conduit 26 into the spiral $u'$ of the secondary cooler $r$ and from there passes through the conduit 27 into the middle of the column $m$ for secondary separation. The liquid nitrogen leaves the primary separation column $k$ through the conduit 28, passes through the spiral $u"$ of the cooler $r$ and leaves the spiral $u"$ through the conduit 29 leading to the top of the secondary column $m$. The liquid nitrogen is, consequently, introduced at the top of the column $m$.

The gaseous nitrogen passing through the conduit 25 and the cold exchanger $f$ is warmed in said exchanger to about —135° C. as it gives up its cold to air contained in the spiral $s$ which is cooled from —100° C. to —175° C. The gaseous nitrogen passes through the conduit 30 into the expansion engine $h$, wherein its pressure drops from 4 atm. to 0.1 atm. and is cooled again to —178° C. It leaves the expansion engine $h$ through the conduit 31 connected with the conduit 32 and is led alternately through either the regenerator A' or the regenerator A" out of the apparatus.

Nine-tenths of the total amount of air flowing into the regenerators passes through the entire bodies of said regenerators and goes through the conduit 33' or 33'' into the conduit 34 leading into the primary separation column k.

The main part of the separated gaseous nitrogen leaves the secondary separation column m through the conduit 35 and passes into the chamber r'' of the cooler r. This gas is warmed therein to —175° C., cooling the wash liquid to —175° C., and passes through the entire chamber r'' and the conduit 36 connected with the conduit 31. The gaseous nitrogen thus reaches the conduit 32 and is led out of the apparatus alternately through the regenerator A', or the regenerator A''.

The separated oxygen having a temperature of about —183° C. leaves the evaporator side of the condenser c through the conduit 37 and enters into the upper part r' of the cooler r separated by a wall from the lower part r''. The oxygen is warmed in the part r' of the cooler r and leaves at the upper end thereof through a conduit 38 leading to, a conduit 39 connected with the regenerators B' and B''. The oxygen leaves the apparatus alternately through one of these regenerators.

It will be noted from the above description that, according to this modification, a part of the air having the condenser pressure is cooled from —100° C. to —175° C. by the cold contents of the nitrogen used later in the expansion machine, whereas, according to the modification describing the production of oxygen containing 40-45% $O_2$, compressed nitrogen or air cooled to —135° C. is liquefied by the cold contents of this nitrogen. The advantage of the process described in the present modification consists in the elimination of the compressor g and the liquefier d. A further advantage consists in the possibility of totally eliminating carbon dioxide frozen in the regenerators, as the snow containing the dioxide is taken up by the separated components by sublimation.

To eliminate carbon dioxide by sublimation, it is necessary to allow the cold exchange in the regenerators to take place with a very small difference in temperature, which should not exceed 2° C. to 3° C.

This is possible when utilizing the above process, because air compressed to 4 atm. has a higher specific heat than the separated components at atmospheric pressure during their passage through the regenerators. Thus a difference in temperature of about 10° C. is created at the lower end of the regenerators, making it improbable that the separated components will totally take up, by sublimation, the deposited dioxide.

In accordance with the described process, 10% of the air is taken out of the regenerators above the temperature zone in which carbon dioxide can be precipitated, and is cooled to —175° C. in the counter-current cold exchanger f by the cold contents of the nitrogen used later in the expansion engine. This amount of air is then separated into components together with the main amount of air, the separated components being led out of the apparatus through the regenerators.

Due to this arrangement, only 90% of the total amount of air entering the regenerators passes through the lower half of said regenerators on the way toward the separating device, whereas 100% of the separated components passes through the entire length of the regenerators on their way out of the apparatus. Consequently, the lower half of the regenerators receives 10% additional cold from the separated components and this is just the amount necessary to balance the temperature difference of 10° C. which is due to the higher specific heat of the air under pressure.

Simultaneously the air takes in 2.5 calories per cubic meter additional cold so that its liquefaction heat is diminished to the same extent. Consequently, a proportionately smaller amount of liquid is evaporated on the evaporator side of the condenser during the liquefaction of air in the condenser, so that an additional amount of liquid remains available to cover the cold losses.

In the modification shown in Figure 3, the gas mixture is used to operate the expansion engine. The apparatus comprises a pair of primary regenerators A', A'' for air and nitrogen, another pair of primary regenerators B', B'' for air and oxygen, a condenser evaporator c, an expansion engine h, a pressure column k for primary separation, a column m for secondary separation, and a secondary cooler r having spirals u' and u'', these parts being similar to those described in connection with Figure 2. The apparatus further comprises a pair of secondary regenerators a and b, which may be replaced, however, by counter-current exchangers. It will be noted that the exchanger f shown in Figure 2 is eliminated according to this modification.

The operation is as follows:

The compressed air which is to be separated into its components is introduced alternately into a pair of primary regenerators A' and A'', or B' and B'', and is cooled therein. About one-fourth of the total amount of air flowing through a regenerator is separated at the lower half thereof at a temperature of about —130° C. and is led through the conduits 22 and 30 into the expansion engine h. The air is cooled therein to about —175° C. and loses a great part of its pressure.

The remaining three-fourths of the total amount of air leaves the regenerators through the conduits 33' and 33'' and passes through the conduit 34 into the pressure column k where it is liquefied and separated into components. Liquid oxygen having 40-45% $O_2$ passes through the conduit 26, the spiral u', and the conduit 27 into the secondary column m. Liquid nitrogen passes through the conduit 28, the spiral u'', and the conduit 29 into the column m in a way similar to that described in connection with Figure 2.

Gaseous nitrogen leaves the secondary column m through a conduit 35 which branches into the conduits 40 and 41. The main part of the gaseous nitrogen passes through the conduit 41, the chamber r'' of the cooler r, the conduits 36, 31 and 32, and either the regenerator A' or the regenerator A''. The separated oxygen leaves the condenser c through the conduit 37 and passes through the chamber r', the conduits 38 and 39, and either the regenerator B' or the regenerator B'' in a way similar to that shown in Figure 2.

A smaller part of the gaseous nitrogen, approximately equal to the amount of air operating in the expansion engine h, passes through the conduit 40 and either the conduit 42 or the conduit 43 into the secondary regenerator b or a. The nitrogen deposits its cold in the secondary regenerator and passes through either the conduit 44 or 45 into the conduits 31 and 32, leaving the apparatus through either the regenerator A' or A''.

The air cooled in the expansion engine h passes through a conduit 46 into either the regenerator b or the regenerator a and is further cooled therein to about —190° C. Obviously, air and nitrogen pass alternately through the regenerators. The cooled air is led through either the conduit 47 or 48 into the conduit 49 which leads the air into the middle of the column m to separate the same.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The method of separating a gas mixture into components, which comprises conducting a gas mixture in cold exchange relation with a cold regenerative body, withdrawing a smaller part of said gas mixture during its cold exchange with said cold regenerative body, liquefying and separating the remainder of said gas mixture into higher and lower boiling components, the component having a lower boiling point being partially in a gaseous state, passing the said smaller part of the gas mixture in cold exchange relation with a part of the lower boiling gaseous component whereby the gaseous component is heated and the gas mixture cooled, expanding such warmed portion of the lower boiling component, subsequently conducting the expanded component in contact with a regenerative body to impart cold to said body, separating the cooled smaller part of the gas mixture into components, and bringing separated components into cold exchange relation with a regenerative body.

2. The method of separating a gaseous mixture into components, which comprises conducting a gas mixture in cold exchange relation with a cold regenerative body, separating said gas mixture into higher and lower boiling components, warming a portion of the lower boiling component by heat exchange with compressed separated gaseous component, dividing the thus warmed lower boiling component into a larger and a smaller portion, further warming the smaller portion by heat exchange relation with a previously compressed portion of such component, compressing the thus further warmed portion, passing said compressed portion in heat exchange relation with a subsequent smaller portion of lower boiling component which is subsequently to be compressed, warming a further portion of lower boiling component by exchange with the compressed and cooled portion whereby the compressed portion is liquefied, adding the liquefied portion to the mixture undergoing separation, expanding the divided warmed larger portion of the lower boiling component, and bringing the expanded lower boiling component and separated higher boiling component into cold exchange relation with regenerative bodies whereby said bodies are chilled.

3. The method of separating a gas mixture, which comprises conducting a gas mixture compressed to condenser pressure into cold exchange relation with a cold regenerative body, separating the cooled gas mixture into higher and lower boiling components, the lower boiling component being partially in a gaseous state, warming a portion of the lower boiling component by heat exchange with compressed separated gaseous component, dividing the thus warmed portion into larger and smaller parts, further heating the smaller part by heat exchange with another part of such component previously compressed, compressing the thus further warmed part, conducting the compressed part in cold exchange relation with a subsequent smaller part of lower boiling component which is subsequently to be compressed, liquefying the thus cooled compressed part by exchange with a portion of lower boiling component, and adding the thus liquefied part to the mixture undergoing separation, expanding the warmed larger portion of the lower boiling component wherein the lowering of temperature is approximately equal to the rise in temperature during warming, and bringing the expanded lower boiling component and separated higher boiling component into cold exchange relation with regenerative bodies whereby such bodies are chilled.

4. The method of separating a gas mixture, which comprises conducting a gas mixture compressed to condenser pressure into cold exchange relation with a cold regenerative body, withdrawing about one quarter of said mixture during its cold exchange with said cold regenerative body, liquefying and separating the remainder of said gas mixture into higher and lower boiling components, the lower boiling component being partially in the gaseous state, expanding the quarter part of said gas mixture removed during cold exchange with a regenerative body whereby the temperature thereof is lowered, bringing the thus expanded quarter part of gas mixture in cold exchange relation with a portion of said lower boiling gaseous component, said portion of gaseous component being thereby warmed and said quarter part of the gas mixture being thereby cooled, separating the cooled quarter part of gas mixture into components, and bringing separated components into cold exchange relation with regenerative bodies.

5. An apparatus for the separation of a gas mixture into components, which comprises in combination a plurality of regenerators in which cold exchange between a gas mixture and a cold regenerative body is effected, a rectifying column whereby the cold gas mixture is separated into components, conduits between said regenerators and said column whereby cooled gas mixture may be conducted from said regenerators to said column and separated components conducted from said column to said regenerators, an expansion engine connected in one of said conduits connecting two of said regenerators with said rectifying column whereby one of said components may be expanded therein and subsequently passed through said regenerator for imparting cold thereto, a heat exchanger connected with said expansion engine through which gas to be expanded is passed in heat exchange relation with a warmer gas and thereby warmed prior to its expansion, and a cooler consisting of a coil within an enclosing chamber positioned about the base of the rectifying column, conduits for conducting liquid formed in the rectifying column to and from said coil, and other conduits for conducting separated gaseous component to and from the enclosing chamber whereby the produced liquid passes in heat exchange relation with separated component.

6. The method for separating gas mixtures into components, which comprises chilling a gas mixture by contacting with cold regenerative bodies in regenerators, withdrawing a part of the chilled gas mixture prior to a complete passage therethrough, liquefying and separating the chilled gas mixture into components and conducting separated components in contact with other respective regenerative bodies whereby cold is imparted to such bodies, the amount of separated component contacting with the respective regenerative bodies in a regenerator being greater than the amount of gas mixture previously contacted with said regenerative bodies in the lower part of the regenerator and of substantially equal amount in the upper part of the regenerator.

7. An apparatus for separating a gas mixture into components including in combination a plurality of regenerators, a primary separating column connected with said regenerators wherein cooled gas mixture is separated into a higher and lower boiling portion, a condenser-vaporizer connected with said primary column and forming the top thereof, a secondary separating column connected with the vaporizer side of said vaporizer-condenser thus forming its base in which a further separation into components is effected by vapors arising on the vaporizer side of the condenser-vaporizer with accompanying cooling and liquefaction on the condenser side, conduits connected with the regenerators at a point intermediate the ends thereof whereby a part of the gas mixture undergoing cold exchange may be withdrawn, a countercurrent cold exchanger having a coil enclosed in an outer space, pipes connecting said coil with the withdrawal conduits from the regenerators and with the primary separating column, said cold exchanger effecting cooling of withdrawn gas mixture substantially to liquefying temperature prior to its conductance to the primary separating column, an expansion engine, conduits connecting said expansion engine with the outer space of said cold exchanger, other conduits connecting the expansion engine with at least two of said regenerators, a conduit connecting the outer space of the cold exchanger with the condenser so that said expansion engine effects an expansion of a separated lower boiling component from the condenser after passage through the cold exchanger, the thus expanded component subsequently passing to a regenerator in which the cold generated by expansion is utilized, and a cooler consisting of coils in enclosing chambers positioned about the base of the primary column, conduits for separately conducting liquids formed in the primary column from said column to the coils, other conduits for separately conducting the liquids from the coils to the secondary column, and still other conduits for conducting separated gaseous higher and lower boiling components from the secondary column to the enclosing chambers, and conduits for passage of the separated components from the enclosing chambers to regenerators, said coolers effecting a cold exchange between liquid formed in the primary column and a gas formed in the secondary column.

8. An apparatus for separating a gas mixture into components which comprises a plurality of primary regenerators wherein a gas mixture is chilled, a primary separating column connected with said regenerators, a condenser-vaporizer connected with said primary column and forming the top thereof, a secondary separating column connected with the vaporizer side of said condenser-vaporizer thus forming its base within which a further separation of a gaseous mixture into components takes place by means of vapors arising from the vaporizer side of the condenser-vaporizer with accompanying cooling and liquefaction on the condenser side, conduits leading from said regenerators at a point intermediate the ends thereof whereby a portion of gas mixture is withdrawn, an expansion engine, conduits connecting said expansion engine with said withdrawal conduits, said expansion engine effecting expansion of withdrawn gaseous mixture, means for effecting cold exchange between the withdrawn and expanded mixture and a separated lower boiling component, conduits connecting said cold exchange means with the secondary separating column for conducting separately a separated component to the cold exchange means and expanded mixture to said column, other conduits connecting the cold exchange means with the expansion engine whereby expanded mixture is conducted to said means, and still other conduits connecting said means with at least two of the regenerators whereby separated component is conveyed to said regenerators, and a cooler consisting of coils in enclosing chambers positioned about the base of the primary column, conduits for separately conducting liquids formed in the primary column from said column to the coils, other conduits for separately conducting the liquids from the coils to the secondary column, and still other conduits for conducting separated gaseous higher and lower boiling components from the secondary column to the enclosing chambers, and conduits for passage of the separated components from the enclosing chambers to regenerators, said coolers effecting a cold exchange between liquid formed in the primary column and a gas formed in the secondary column.

9. An apparatus for separating a gas mixture into components, including in combination means for effecting a cold exchange between a gas mixture and separated components, means for liquefying and separating said gas mixture into higher and lower boiling components, the first mentioned means being connected in operative relation by conduits for passing gases to and from with the second mentioned means, means for effecting a cold exchange between gaseous and liquid separated components, gas expanding means positioned between said first mentioned cold exchange effecting means and the liquefying and separating means wherein a separated component is expanded, and a conduit connecting the gas expanding means with the first mentioned cold exchange effecting means whereby expanded component is conducted directly to such means for imparting cold thereto, and means for introducing a portion of said separated components into the expanding means at a comparatively high temperature.

10. An apparatus for separating a gas mixture into components, including in combination a plurality of regenerators, means for liquefying and separating said gas mixture into higher and lower boiling components, said means being operatively connected by conduits for passing gas to and from with said regenerators, a cooler connected with said liquefying means for effecting cold exchange between gaseous and liquid separated components, an expansion engine connected with said liquefying and separating means and with at least two regenerators wherein the separated component is expanded and subsequently passed through one of said regenerators to impart cold thereto by means of conduits connecting said expansion engine with said regenerators, and means for introducing a portion of said separated components into the expansion engine at a comparatively high temperature.

11. An apparatus for separating a gas mixture into components, including in combination means for effecting a cold exchange between a gas mixture and separated components, means for liquefying and separating said gas mixture into higher and lower boiling components, the first mentioned means being connected in operative relation by conduits for passing gases to and from with the second mentioned means, means for effecting a cold exchange between gaseous and liquid separated components, gas expanding means positioned between said first mentioned cold exchange effecting means and the liquefying and separating means wherein a separated component is expanded, and a conduit connecting the gas expanding means with the first mentioned cold exchange effecting means whereby expanded component is conducted directly to such means for imparting cold thereto.

MATHIAS FRÄNKL.